United States Patent Office 3,499,927
Patented Mar. 10, 1970

3,499,927
GUANIDINO DERIVATIVES OF POLYALKYLENE POLYAMINES
George Gerald Badcock, New Brighton, and Wilfred James Cecil Dyke, Upton-by-Chester, England, assignors to Evans Medical Limited, Liverpool, England, a British company
No Drawing. Filed Aug. 19, 1965, Ser. No. 481,122
Claims priority, application Great Britain, Aug. 24, 1964, 34,538/64
Int. Cl. C07c *129/12*
U.S. Cl. 260—564      12 Claims

ABSTRACT OF THE DISCLOSURE

There are provided compounds of the formula

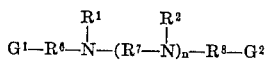

and their physiologically acceptable acid addition salts, where $R^1$ and each group $R^2$ which may be the same or different are hydrogen, an alkyl group, or an N-substituted alkyl group e.g. an alkyl group substituted with a further guanidino group $G^3$, $R^6$, and group $R^7$ and $R^8$ which may be the same or different are each a straight or branched alkylene group separating adjacent nitrogen atoms by at least two carbon atoms, the total number of carbon and nitrogen atoms in the straight chain between the two groups $G^1$ and $G^2$ excluding branching groups, being always greater than 12, $n$ is an integer from 0–4, $G^1$, $G^2$ and each group $G^3$ which may be the same or different have the formula

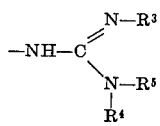

where $R^3$ and $R^4$ which may be the same or different are hydrogen atoms or aliphatic groups having 1–4 carbon atoms and $R^5$ is a hydrogen atom, an aliphatic group having 1–4 carbon atoms or an amino or acyl group. The compounds exhibit antifungal and antibacterial activity.

---

This invention is concerned with novel guanidino derivatives of polyalkylene polyamines.

We have found that certain guanidino derivatives of polyalkylene polyamines, which are described in detail below, possess valuable activity against human and/or animal and/or plant pathogens. The new compounds possess antifungal activity particularly against the pathogenic fungus *Candida albicans*, which gives rise to a variety of diseases in humans, and antibacterial activity against, for example, such organisms as *Pseudomonas pyocyaneus, Staphylococcus aureus* and/or *Escherischia coli*. Furthermore, activity has been shown by a number of the new compounds against plant pathogenic fungi including inter alia *Erysiphe graminis, Venturia inaequalis, Podisophoera leuchrotricha, Uromyces fabae, Botrytis fabae*, and *Cercospora melonis*. In addition to the antifungal and antibacterial effects in humans, antiviral, analgesic and antiheparin activities have been demonstrated by some of the compounds. The new compounds are desirably utilised as their acid addition salts and in general are water soluble, this being in contrast to previously proposed antifungal compounds such as griseofulvin. The compounds further have a low toxicity. They also have the important practical advantage that they can be prepared from readily available starting materials, as is also described below.

According to the present invention we provide compounds of the general formula

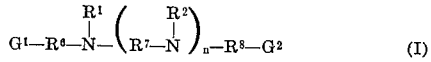

and their physiologically acceptable acid addition salts, where:

$R^1$ and each group $R^2$ which may be the same or different are hydrogen, an alkyl group, or an N-substituted alkyl group e.g. an alkyl group substituted with a further guanidino group $G^3$, $R^6$, and group $R^7$ and $R^8$ which may be the same or different are each a straight or branched alkylene group separating adjacent nitrogen atoms by at least two carbon atoms, the total number of carbon and nitrogen atoms in the straight chain between the two groups $G^1$ and $G^2$ excluding branching groups, being always greater than 12, $n$ is an integer from 0–4, $G^1$, $G^2$ and each group $G^3$ which may be the same or different have the formula

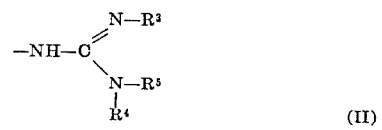

where $R^3$ and $R^4$ which may be the same or different are hydrogen atoms or aliphatic groups having 1–4 carbon atoms and $R^5$ is a hydrogen atom, an aliphatic group having 1–4 carbon atoms or an amino or acyl group.

While the alkylene chains $R^6$, $R^7$ and $R^8$ may each contain, for example, up to 20 carbon atoms, they preferably contain not more than 15 carbon atoms and advantageously not more than 12 carbon atoms. In compounds which are particularly useful against *Candida albicans* the preferred chain length for these alkylene groups is of the order of 6 carbon atoms. In compounds which are particularly useful against bacteria infecting humans and against plant pathogenic fungi, the preferred chain lengths for these alkylene groups is greater than 6 carbon atoms, for example 8, 10 or 12 carbon atoms.

The preferred compounds are those in which $R^1$ and $R^2$ are each a methyl group or a hydrogen atom.

Particularly preferred compounds according to the invention are N,N'-bis-(3-guanidinopropyl)hexamethylenediamine, N,N'-bis-(6-guanidinohexyl)hexamethylenediamine, N,N' - bis - (6-guanidinohexyl)trimethylenediamine and bis-(8-guanidinooctyl)amine which in our tests have shown marked activity against *Candida albicans*, and bis-(10-guanidinodecyl)amine and bis-(12-guanidinododecyl)amine which have shown marked activity against certain plant pathogenic fungi.

The last named compound has also shown useful antibacterial activity and bis-(8-guanidinooctyl)amine has in addition shown interesting activity against certain plant pathogenic fungi.

The substituents $R^3$, $R^4$ and $R^5$ are preferably all hydrogen.

$n$ is preferably 0 or 1.

Where $R^5$ is acyl, this is preferably an aliphatic acyl group having 1 to 4 carbon atoms, e.g. an acetyl, propionyl, acrylyl group etc., a substituted aliphatic acyl group having 1 to 4 carbon atoms in the alkane part, e.g. a trichloracetyl, hydroxypropionyl group etc. or an aromatic carboxylic acyl group e.g. a benzoyl, p-amino benzoyl group etc. Where $R^3$, $R^4$ and/or $R^5$ is an aliphatic group this may, for example be a straight chained or branched chained alkyl group, e.g. a methyl, ethyl, butyl group etc.

The bases according to the invention have a number of basic groups and can therefore form mono-, di- and poly-acid addititon salts which are all included within the present invention. The full poly-acid addition salts are preferred: Such salts include, for example, salts with mineral acids, e.g. hydrochlorides, hydrobromides, sulphates, perchlorates, nitrates, phosphates, pyrophosphates, etc. and salts with organic acids, e.g. formates, acetates, propionates, glycolates, lactates, pyruvates, malonates, succinates, maleates, fumarates, malates, tartrates, citrates, oxalates, benzoates, salicylates, acetylsalicylates, methanesulphonates, ethanesulphonates, p-toluene sulphonates etc.

The compounds according to the invention may be used in human and veterinary medicine in the form of pharmaceutical compositions containing one or more pharmaceutical carriers or excipients suitable, for example, for oral, topical, rectal, intravaginal or parenteral administration. They may be used together with other medicinal agents. The compositions are preferably in dosage unit form and each dosage unit preferably contains 0.5 to 500 mg. of the active compound, advantageously 5 to 250 mg., for example 10 to 150 mg.

For administration as solid oral preparations such as tablets or capsules, conventional carriers may be employed, for example, gelatin, lactose, starch, talc, magnesium stearate, hydrogenated oils, polyglycols etc. The compositions may also take the form of liquid oral preparations for ingestion such as solutions, syrups, elixirs, emulsions etc., which may contain suspending, emulsifying, stabilising and preserving agents and may also contain acceptable sweetening, flavouring or colouring agents. The compounds may be prepared for local application to the mucous membranes of the nose and throat and may take the form of liquid sprays or powder insufflations, nasal drops, throat paints or similar preparations. Formulations for external applications may be prepared in oily, aqueous or powdered media in the form of conventional skin paints, lotions, creams, ointments, aerosols, dusting powders etc. Suppositories and pessaries may contain a conventional base e.g. oil of theobroma, polyglycols, glyco-gelatin bases together with surface active agents if required. The injectable preparations may take the form of aqueous or oily solutions, emulsions, suspensions or solids for reconstitution before use. Suitable vehicles include, for example, sterile, pyrogen-free water, parenterally acceptable oils, oily esters or other non-aqueous media such as propylene glycol, if desired containing suspending, dispersing, stabilising, preserving, solubilising, emulsifying or buffering agents.

The pharmaceutical compositions according to the invention preferably contain the active material at a concentration of 0.1 to 95% by weight, advantageously 0.5 to 40%.

For horticultural or agricultural use the compounds according to the invention may be formulated for use in any desired way. Generally such formulations will include the compound in association with a suitable carrier or diluent. Such carriers may be liquid or solid and designed to aid the application of the compound either by way of dispersing it where it is to be applied or to provide a formulation which can be made by the user into a dispersible preparation.

Liquid preparations thus include preparations of the compound in the form of solutions or emulsions which can be used on their own or be adapted to be made up with water or other diluents to form sprays etc.; in such cases the carrier is a solvent or emulsion base nonphytotoxic under the conditions of use. Generally such preparations will include a wetting, dispersing or emulsifying agent. Other liquid preparations include aerosols in which the compound is associated with a liquid carrier or propellant.

Solid preparations include dusts and wettable powders, granulates and pellets, and semi-solid preparations such as pastes. Such preparations may include inert solid or liquid diluents such as clays, which may themselves have wetting properties, and/or wetting, dispersing or emulsifying agents; binding and/or adhesive agents may also be included. Solid preparations also include thermal fumigating mixtures wherein the compound is associated with a solid pyrotechnic component. In these formulations, the concentratiton of active material is preferably between 0.01% and 40% by weight.

The compounds according to the invention may be prepared in any convenient way, advantageously by the following method.

A compound of the general formula

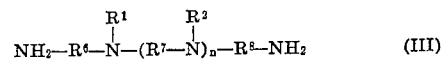

$$NH_2—R^6—\overset{R^1}{\underset{|}{N}}—(R^7—\overset{R^2}{\underset{|}{N}})_n—R^8—NH_2 \qquad (III)$$

may be reacted with a thiourea derivative of the general formula

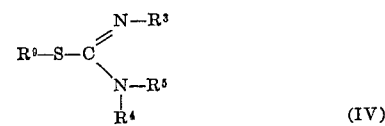

$$R^9—S—C\overset{\displaystyle N—R^3}{\underset{\displaystyle \underset{R^4}{\overset{|}{N}—R^5}}{\diagdown}} \qquad (IV)$$

where $R^9$ is an alkyl or aralkyl group, e.g. a methyl, ethyl, propyl, butyl or benzyl group and $R^1$, $R^2$, $R^3$, $R^4$, $R^6$, $R^7$ and $R^8$ have the meanings given above and $R^5$ is a hydrogen atom an amino group, or an aliphatic group having 1–4 carbon atoms, or a salt thereof e.g. a mineral acid salt such as a hydrohalide a nitrate or a sulphate.

The reaction may be effected in the presence or absence of a solvent, suitable solvents, where present, including water and water-miscible organic solvents such as water-miscible alcohols, ethers, ketones, or acids, e.g. methanol, ethanol, propanol, dioxan, tetrahydrofuran, acetone, methyl ethyl ketone, acetic acid etc. The reaction temperature is not especially critical and normal temperaturé is generally convenient, although higher temperatures, e.g. up to the boiling point of the medium, can also be used.

Other useful preparative methods for obtaining the new compounds include:

(1) Reaction of cyanamide with the amide of Formula III given above where $R^1$, $R^2$, $R^6$, $R^7$, $R^8$ and $n$ have the meanings given above with respect to Formula III, to give compounds having unsubstituted guanidine groups.

(2) Reaction of the amine (III) with N-nitroso guanidine; this method also gives an unsubstituted guanidine group. The nitrosoguanidine may, however, carry an N-alkyl substituent to yield and N-alkyl guanidine.

(3) Reaction of the amine (III) with with a cyanogen halide followed by reaction with ammonia or an amine.

(4) Reaction of a substituted thiourea of the general formula

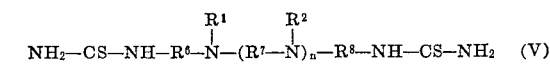

$$NH_2—CS—NH—R^6—\overset{R^1}{\underset{|}{N}}—(R^7—\overset{R^2}{\underset{|}{N}})_n—R^8—NH—CS—NH_2 \qquad (V)$$

where $R^1$, $R^2$, $R^6$, $R^7$, $R^8$ and $n$ have the meanings given above, with mercuric oxide and an amine or ammonia.

The amines of Formula III used in the methods given above can be conveniently prepared by reduction of the corresponding nitriles of the general formula

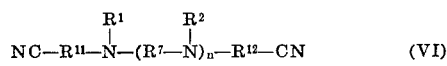

$$NC—R^{11}—\overset{R^1}{\underset{|}{N}}—(R^7—\overset{R^2}{\underset{|}{N}})_n—R^{12}—CN \qquad (VI)$$

where $R^1$, $R^2$, $R^7$ and $n$ have the meanings given above with respect to Formula III and $R^{11}$ and $R^{12}$ are similar to $R^6$ and $R^8$ respectively except that they contain one less carbon atom each.

The above nitriles can be prepared for example, by the addition of an ethylenically unsaturated nitrile such as acrylontirile to a diamine. The use of acrylonitrile will lead to amines of Formula III having terminal —NH(CH$_2$)$_3$NH$_2$ groups.

The reduction of the nitrile of Formula VI is prefeerably effected under pressure at an elevated temperature using a nickel catalyst, in a solvent such as ethanolic ammonia (10%). Pressures of from 90–100 atmospheres and temperatures of about 100° C. may conveniently be used.

The amines of Formula III can also be prepared by condensation of alkylenediamines with alkylene dihalides, preferably the chlorides or bromides. It is to be noted that mixed dihalides may be used, for example 1,3-chlorobromopropane. The liberated hydrogen halide is neutralised for example by conversion into the corresponding alkali metal halide, using an alkali metal ethylate in solution in a solvent such as ethanol. The solvent may then be removed, e.g. by distillation, the alkali metal halide extracted and the amine of Formula III separated by fractional distillation. If the boiling point of the amine is too high for distillation it is sometimes possible to convert the crude amine into the guanidine of Formula I without further purification.

By analogy wtih the process given above it is also possible to prepare the amines of Formula III by condensing amines and/or diamines with cyanhydrins followed by reduction.

Where the preparative method leads to an unsubstituted guanidine group, the substituents $R^3$, $R^4$ and $R^5$ may be introduced subsequently, e.g. by alkylation, for example using conventional techniques such as reaction with an alkyl halide, sulphate or aromatic-sulphonate alkylating agent, or acylation, e.g. using a functional derivative of a carboxylic acid, for example the acid halide, anhydride etc.

The methods of preparation of the new compounds described herein will in general give rise to the compounds in the form of salts. The free base may be prepared from the salt by treatment with a strong anion exchange resin or treatment with caustic alkali or silver oxide. Other salts may be formed from the free base so obtained. Alternatively if it is desired to change the anion of an acid addition salt, conventional ion exchange techniques may be used. e.g. using anion exchange resins.

The following Tables I to VI show the results of testing carried out against various pathogens. Table I shows the results of a Tube Dilution Assay against certain human fungi and pathogenic bacteria in respect of the products of Examples 7, 8 and 9.

Table II shows the results of a Tube Dilution Assay against various strains of *Candida albicans*, at various dilutions, in respect of the products of Examples 1, 2, 4 and 5. Table III shows the $LD_{95}$ values for the products of Examples 2, 7 and 8 against certain plant pathogenic fungi as determined by the method of Pianka and Hall (J. Sci. Food and Agric. 1957, 432).

Table IV shows the activity of the products of Examples 7 and 8 against *Botrytis fabae*, *Venturia inaequalis* and *Uromyces fabae* assessed by the leaf disc technique.

Table V shows the results of testing the products of Examples 5, 7, 8 and 9 against *Venturia inaequalis*, *Erysiphe graminus* and *Podosphaera leucostricha* by inoculating both treated and untreated leaves with the pathogen spores (Cross, McWilliam and Rhodes, J. Gen. Microbiol. 34, 51–65, 1964).

Table VI shows the results of growth tests against a number of seed disease organisms in respect of the products of Examples 5 and 7.

Table VII shows results of in vitro minimum inhibitory concentration tests against various pathogens on agar plates (Cup Plate Assays) in respect of the products of Examples 5, 7, 8 and 9.

TABLE I

| Compound | Minimum inhibitory concentrations (µg./ml.) | | | | |
|---|---|---|---|---|---|
| | C. albicans | S. Aureus | E. Coli | Ps. Pyocyaneus | B. Subtilis |
| Bis-(12-Guanidino-dodecyl)amine hydrochloride (Example 8) | 1–5 | 1–5 | 1–5 | 5–50 | 1–5 |
| Bis-(10-Gunaidino-decyl)amine sulphate (Example 7) | 1–5 | 1.5 | 5–50 | 5–50 | 1–5 |
| Bis-(8-Guanidino-octyl)amine sulphate (Example 9) | 1–5 | 5.50 | 5–50 | 100 | 5–50 |

TABLE II

| Strain of Candida albicans | Inoculum level (orgs./ml.) | Minimum inhibitory concentration (µg./m.) | | | |
|---|---|---|---|---|---|
| | | Product of (Example 1) | Product of (Example 2) | Product of (Example 4) | Product of (Example 5) |
| C 316 | 5,000×10⁶ | 230 | 250 | 250 | 250 |
| | 50×10⁶ | 31.2 | 31.2 | 31.2 | 31.2 |
| | 5×10⁵ | 31.2 | 31.2 | 31.2 | 31.2 |
| Stockton | 5,000×10⁶ | 250 | 250 | 250 | 62.5 |
| | 50×10⁶ | 31.2 | 31.2 | 31.2 | 31.2 |
| | 5×10⁵ | 31.2 | 31.2 | 31.2 | 31.2 |
| Woods | 5,000×10⁶ | 250 | 250 | 250 | 250 |
| | 50×10⁶ | 125 | 125 | 31.2 | 31.2 |
| | 5×10⁵ | 31.2 | 31.2 | 31.2 | 31.2 |
| Gregory | 5,000×10⁶ | 250 | 250 | 250 | 250 |
| | 50×10⁶ | 31.2 | 31.2 | 62.5 | 31.2 |
| | 5×10⁵ | 31.2 | 31.2 | 31.2 | 31.2 |

TABLE III

| Compound | $LD_{95}$ | | | |
|---|---|---|---|---|
| | Cercospora Melonis | Venturia Inaequalis | Botrytis cinerea | Fusarum bulbigenum |
| N,N'-bis-(3-aminopropyl) hexamethylenediamine hydrochloride | 10 | 90 | 10 | 100 |
| Bis-(10-guanidino-decyl)-amine hydrochloride | 10 | 18 | 10 | 50 |
| Bis-(12-guanidino-dodecyl)-amine hydrochloride | 10 | 25 | 10 | 50 |

TABLE IV

| Compound | Conc. | Botrytis fabae, per cent kill | Uromyces fabae per cent kill | Venturia inaequalis |
|---|---|---|---|---|
| Bis-(10-guanidino-decyl)-amine hydrochloride. | 100 | 97 | 99+ | |
| | 50 | 98 | | |
| | 10 | 91 | | |
| Bis-(12-guanidino-dodecyl)-amine hydrochloride. | 300 | | | 96 |
| | 100 | 97 | 97 | |
| | 50 | 94 | | |
| | 10 | 46 | | |

TABLE V

| Product of— | Venturia inaequalis (apple scab) spore germination test, minimum inhibiting concentration in p.p.m. | Apple scab greenhouse test, compounds sprayed on leaves of potted apple rootstocks percent reduction of disease when compared with untreated leaves | | Barley mildew (Erysiphe graminis) greenhouse test, compounds sprayed on leaves of barley plants in pots percent reduction of disease when compared with untreated leaves, 200 p.p.m. | Apple mildew (Podosphaera leucotricha) greenhouse test, compounds, sprayed on leaves of potted apple rootstocks, percent reduction of disease when compared with untreated leaves | |
|---|---|---|---|---|---|---|
| | | 200 p.p.m. | 50 p.p.m. | | 200 p.p.m. | 100 p.p.m. |
| Example 5 | 10 | | | 19 | | |
| Example 7 | 10 | 83 | 57 | 76 | 39 | 40 |
| Example 8 | 5 | 41 | | 5 | 18 | 17 |
| Example 9 | 20 | 99 | 94 | 98 | 77 | 74 |

TABLE VI

Growth tests against selected seed disease organisms

Figures represent percentage of healthy plants in respectively, the treated and the untreated batches of plants (percent). Figures represent number of diseased roots in respectively the treated and untreated plants.

| Product of— | Fusarium culmorum | | Fusarium graminearum | | Fusarium nivale | | Phoma betae | | Xanthomonas malvacearum | | Ophiobolus graminis | |
|---|---|---|---|---|---|---|---|---|---|---|---|---|
| Example 5 | | | 36 | | 32 | | 43 | | 21 | | | |
| Example 7 | 95 | 68 | 47 | 32 | 54 | 10 | 45 | 21 | 53 | 38 | 24 | 40 |

TABLE VII.—IN VITRO LABORATORY TESTS ON AGAR PLATES; ZONE SIZES GIVEN BY THE COMPOUNDS WHEN ASSAYED AGAINST THE NAMED SEED DISEASE ORGANISMS

[Concentrations in p.p.m.; zone sizes in mm.]

| Product of— | Ustilago nuda | | Ustilago hordei | | Ustilago kolleri | | Ustilago avenae | | Helminthosporium gramineum | |
|---|---|---|---|---|---|---|---|---|---|---|
| | 200 | 20 | 200 | 20 | 200 | 20 | 200 | 20 | 200 | 20 |
| Example 5 | 15.8 | 0 | | | | | | | Trace | 0 |
| Example 7 | 12.2 | 0 | 13.4 | 0 | 17.0 | 0 | 14.8 | 0 | 21.0 | 14.6 |
| Example 8 | | | Trace | 0 | Trace | 0 | Trace | 0 | 0 | 0 |
| Example 9 | 0 | 0 | 18.6 | 17.6 | 25.7 | 21.8 | 31.5 | 31.0 | 18.9 | 12.3 |

| Product of— | Helminohosporium avenae | | Fusarium culmorum | | Fusarium nivale | | Phoma betae | | Xanthomonas medicaginis | |
|---|---|---|---|---|---|---|---|---|---|---|
| | 200 | 20 | 200 | 20 | 200 | 20 | 200 | 20 | 200 | 20 |
| Example 5 | 18.2 | 0 | 21.5 | 0 | 14.2 | 0 | 15.1 | 11.2 | | |
| Example 7 | 18.1 | 13.6 | 18.3 | 13.7 | 16.8 | 11.8 | 18.0 | 13.6 | 19.0 | 0 |
| Example 8 | 12.5 | 0 | 0 | 0 | 11.4 | Trace | 11.1 | 0 | 15.5 | 0 |
| Example 9 | 19.6 | 15.5 | 28.2 | 28.7 | 28.0 | 24.3 | 16.1 | Trace | 0 | 0 |

| Product of— | Ophiobolus graminis | | Pythium asphenidermatum | | Pseudomonas medicaginis | | Ustilago mayolis | | Rhizoctona solani | |
|---|---|---|---|---|---|---|---|---|---|---|
| | 200 | 20 | 200 | 20 | 200 | 20 | 200 | 20 | 200 | 20 |
| Example 5 | 0 | 0 | 18.2 | 14.2 | 0 | 0 | | | 0 | 0 |
| Example 7 | 24.9 | 15.0 | 19.9 | 0 | 0 | 0 | 18.6 | 11.0 | 21.8 | 15.0 |
| Example 8 | 0 | 0 | Trace | 0 | 11.5 | 0 | 12.5 | 0 | 13.8 | 0 |
| Example 9 | 24.9 | 26.0 | 31.9 | 31.0 | 0 | 0 | | | 0 | 0 |

In order that the invention may be well understood we give the following examples by way of illustration only (all temperatures are in ° C.):

EXAMPLE 1

Acrylonitrile (97.1 grams) was added slowly with stirring to iminobispropylamine (100.4 grams), the temperature being kept below 30° C. The mixture, after standing for 3 days, was hydrogenated at 100° C. and 100 atmospheres pressure in the presence of ethanolic ammonia solution (200 millilitres of 10%) and Nicat NP-AC60 nickel catalyst (5 grams). After removal of the catalyst by filtration, and ammonia and ethanol by distillation, the residue was fractionated at reduced pressure, giving 21.8 grams of the tetrakis-(trimethylene) pentamine of boiling point 125–130°/0.07 mm.

A solution of 83.7 grams of S-methylisothiouronium sulphate in 270 millilitres of water was well stirred with 72.5 grams of tetrakis-(trimethylene)pentamine, and the mixture allowed to stand at room temperature for 24 hours. After heating for 1 hour to drive off the methyl mercaptan which was formed, 300 milliliters of 3-N-sulphuric acid was added and sufficient ethanol to allow crystallisation to take place. The solid which formed was collected and recrystallised from a mixture of water and ethanol.

Bis-[3-(3-guanidinopropylamino)propyl-]amine sulphate
[NH$_2$.C.(=NH).NH.(CH$_2$)$_3$.NH.(CH$_2$)$_3$.NH.
(CH$_2$)$_3$.NH.(CH$_2$)$_3$.NH.C.(=NH).NH$_2$.]$_2$.
5H$_2$SO$_4$, was a white solid of melting point 265–268° C.

EXAMPLE 2

Acrylonitrile (150 millilitres) was slowly added with stirring to a solution of hexamethylenediamine (116 grams) in 120 millilitres of water, the temperature being maintained below 30° C. After the addition was completed the mixture was stirred for a further half hour and then allowed to stand overnight. The excess of acrylonitrile and the water were removed by distillation under reduced pressure on the steam bath. The residue was dissolved in ethanolic ammonia (10%) and hydrogenated at 100° C. and 90–100 atmospheres pressure in the presence of 100 grams of Nicat NP AC–60 nickel catalyst. After removal of the catalyst, ammonia and alcohol, the residue was fractionally distilled yielding N-(3-aminopropyl)hexamethylenediamine (49.8 grams B.P. 166–181° C.) in the fore-run, and N,N'-bis-(3-aminopropyl)hexamethylenediamine (37.9 grams B.P. 167–169°/1.2 mm.).

A mixture of 11.6 grams of N,N'-bis-(3-aminopropyl)hexamethylenediamine and 13.9 grams of S-methylisothiouronium hydrochloride in 150 millilitres of water was allowed to stand at room temperature overnight and then heated for one hour on a steam bath. The water was removed by distillation under reduced pressure and the gummy residue was solidified by treatment with acetone. The product which weighed 21.7 grams was twice recrystallised from ethanol/water mixture to give N,N'-bis-(3-guanidinopropyl)hexamethylendiamine hydrochloride of formula:

NH$_2$.C.(=NH).NH.(CH$_2$)$_3$.NH.(CH$_2$)$_6$.NH.
(CH$_2$)$_3$.NH.C(=NH).NH$_2$.4HCl of M.P. 279° C.

EXAMPLE 3

N,N'-bis-(3-aminopropyl)hexamethylenediamine was prepared using the procedure of the first part of Example 2.

S-methylisothiouronium sulphate (15.3 g.) was dissolved in water (100 millilitres) and converted to the corresponding hydrochloride using barium chloride; the volume of the solution was then adjusted to 150 millilitres. This solution was then added to 11.6 g. of N,N'-bis-(3 - aminopropyl)hexamethylenediamine, swirled until mixed and then allowed to stand overnight. After heating for a further hour on a steam bath, 2 N hydrochloric acid (50 millilitres) was added, the water removed by vacuum distillation over a steam bath and the residue hardened with acetone. 21.7 g. of N,N'-bis-(3-guanidinopropyl)hexamethylenediamine hydrochloride having a melting point of 272° C. was obtained. Yield 94.4%. On recrystallisation from ethanol/water the melting point was 279° C.

EXAMPLE 4

1,3-bromochloropropane (240 grams) was rapidly added to a solution of hexamethylenediamine (1044 grams) in ethanol (800 millilitres) contained in a flask provided with a reflux condenser. The heat of reaction caused the mixture to boil and boiling was maintained by external heating for 18 hours. After cooling, a solution of sodium (69 grams) in ethanol (1 litre) was slowly added with stirring and the precipitated salts afterwards removed by filtration. The alcohol was distilled off under a vacuum and the residue stirred with benzene (2 litres). A further lot of precipitate salts were removed by filtration. The benzene was distilled off and the residue fractionally distilled. There was thus obtained 627 grams of unreacted hexamethylenediamine and 324 grams (61%) of N,N'-bis-(6-aminohexyl)trimethylenediamine of B.P. 176°/0.2 mm.

A mixture of 12.5 grams of S-methylisothiouronium sulphate and 13.6 grams of N,N'-bis-(6-aminohexyl)trimethylenediamine in 60 millilitres of water was allowed to stand for 16 hours at room temperature and then heated for 1 hour on a steam bath. On cooling and addition of 33 millilitres of 3 N sulphuric acid a crop of crystals weighing 20.6 grams was deposited which after recrystallisation from water gave pure N,N'-bis-(6-guanidinohexyl)trimethylenediamine sulphate of M.P. 219° C.

NH$_2$.C.(=NH).NH.(CH$_2$)$_6$.NH.(CH$_2$)$_3$.
NH.(CH$_2$)$_6$.NH.C(=NH).NH$_2$.2H$_2$SO$_4$

EXAMPLE 5

A solution of 1,6-dibromohexane (27.5 grams) and hexamethylenediamine (78 grams) in ethanol (150 millilitres) was heated under reflux for 18 hours. A solution of sodium (5.3 grams) in alcohol (100 millilitres) was added and the alcohol then removed by distilling off under reduced pressure. The residue was extracted with four 250 millilitre quantities of ether. The ether from the combined extracts was removed by evaporation and the residue on fractionation furnished 57 grams of unchanged hexamethylenediamine and 21.3 grams of tris-hexamethylenetetramine which was used without further purification.

A mixture of tris-(hexamethylene)tetramine (21.3 grams) and S-methylisothiouronium sulphate (16.4 grams) in water (120 millilitres) was allowed to stand overnight at room temperature and the evolution of mercaptan which took place was completed by heating for 2 hours on a steam bath. Addition of 46 millilitres of 3 N sulphuric acid followed by excess of ethanol caused precipitation of a white solid which was recrystallised from water to give N,N'-bis-(6-guanidinohexyl)hexamethylenediamine sulphate, NH$_2$.C.(=NH).NH.(CH$_2$)$_6$.NH.(CH$_2$)$_6$.NH.
(CH$_2$)$_6$.NH.C(=NH).NH$_2$.2H$_2$SO$_4$ of M.P. 256°.

EXAMPLE 6

A mixture of bis-(6-aminohexyl)amine (10.8 grams) and S-methylisothiourea sulphate (15 grams) in water (150 millilitres) was allowed to react for 16 hours at room temperature followed by one hour's heating on a steam bath. Sulphuric acid (16.7 millilitres of 3 N) were added and the heating continued for 1 hour. The water was removed by distillation at reduced pressure and the residue was twice recrystallised from aqueous alcohol. There was thus obtained 12.3 grams of bis-(6-guanidinohexyl)amine sulphate

[NH$_2$.C.(=NH).NH.(CH$_2$)$_6$.NH.(CH$_2$)$_6$.
NH.C(=NH).NH$_2$]$_2$.3H$_2$SO$_4$ of M.P. 247°.

EXAMPLE 7

To a solution of 3 grams of S-methylisothiouronium sulphate in 15 millilitres of water was added 3.3 grams of bis-(10-aminodecyl)amine. The mixture was heated for one hour on a boiling water bath whilst methyl mercaptan was eliminated. After addition of 3.3 ml. of 3 N sulphuric acid and cooling, the white solid which separated, was filtered off and twice recrystallised from water yielding 3.15 grams of bis-(10-guanidinodecyl)amine sulphate NH$_2$.C.(=NH).NH.(CH$_2$)$_{10}$.NH.(CH$_2$)$_{10}$.
NH.(=NH).C.NH$_2$.1.5H$_2$SO$_4$ of M.P. 207° C. The bis-(10-aminodecyl)amine was obtained from the higher boiling fractions following the catalytic hydrogenation of sebaconitrile using a nickel catalyst, and had B.P. 218–220°/0.7 mm.

EXAMPLE 8

To a solution of S-methylisothiouronium hydrochloride, prepared by treating 23.7 grams of S-methylisothiouronium sulphate with 20.8 grams of barium chloride dihydrate in 300 millilitres of water and filtering off the precipitated barium sulphate, was added 30 grams of bis-(12-aminododecyl)amine. The mixture was heated for three hours on a steam bath, treated with 39.5 millilitres of 3 N hydrochloric acid, and then concentrated to a gummy residue by evaporation at reduced pressure. The residue was hardened by treatment with acetone and weighed 32.4 grams. Following recrystallisation from a mixture of equal parts by volume of glacial acetic acid and acetone, the so obtained bis-(12-guanidinododecyl) amine hydrochloride

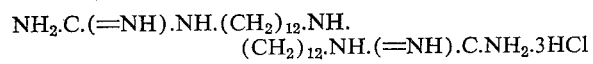

had M.P. 195° C.

EXAMPLE 9

Bis-(8-guanidinooctyl)amine sulphate

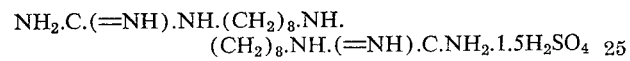

of M.P. 234° C. was prepared in a manner similar to that described in Example 7, from bis-(8-aminooctyl)amine (18.2 grams), and S-methylisothiouronium sulphate (20.2 grams), in water (380 millitres). The final solution was treated with 22.2 millilitres of 3 N sulphuric acid, concentrated in vacuo and the residue recrystallised from aqueous isopropanol.

EXAMPLE 10

A mixture of 20.3 grams of N,N'-bis-(6-aminohexyl) isopropylene diamine B.P. 184–7°/0.35 mm. (prepared by the reaction of 1,6-diaminohexane with 1,2-dichloropropane in ethanol), 22.1 grams of S-methylisothiouronium sulphate and 130 millilitres of water was allowed to stand at room temperature overnight. After heating for two hours on a steam bath, the solution was treated with 49 millilitres of 3 N sulphuric acid. The gummy residue which resulted after concentrating the liquor in vacuo, was extracted with ethanol, and the insoluble portion recrystallised from 50% aqueous methanol. The so obtained N,N'-bis - (6 - guanidinohexyl)isopropylenediamine sulfate

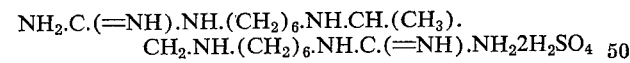

had M.P. 30–40° C.

EXAMPLE 11

Oral elixir

Formula:
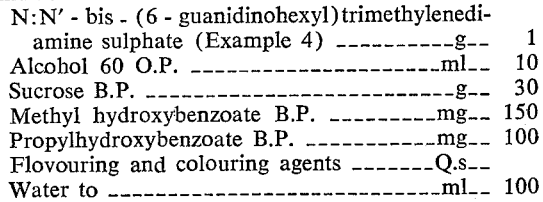

Method of preparation:

(1) Dissolve sucrose in 50 ml. water, add N:N'-bis-(6-guanidinohexyl) trimethylenediamine sulphate and dissolve.

(2) Dissolve methyl and propyl hydroxybenzoates in alcohol, add flavouring agents, mix and add to the aqueous solution.

(3) Add a solution of the colouring agents; make up to volume with water, mix well and filter.

Dose:

5 ml. (one teaspoonful) of the elixir contains 50 mg. of N:N'- bis - (6 - guanidinohexyl) trimethylenediamine sulphate.

EXAMPLE 12

Injection 10 mg. per ml.

Formula:
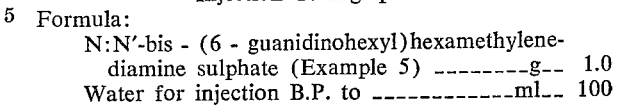

Method of preparation:

Dissolve N:N' - bis - (6 - guanidinohexyl)hexamethylenediamine sulphate in sufficient water for injection to make 100 ml. Sterilise by filtration through a 5/3 sintered glass filter. Aseptically pack in sterile 1 ml. ampoules.

EXAMPLE 13

Tablet, 50 mg.

Formula:
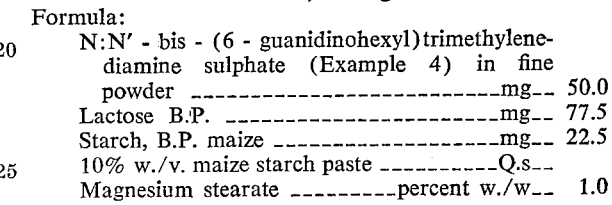

Method of preparation:

(1) Blend the powders and damp with starch paste. Mix thoroughly.

(2) Pass the wet mass through a 12 mesh screen and dry the resultant granules at 50° C.

(3) Screen the dry granules 18 mesh and blend with the magnesium stearate.

(4) Compress into tablets. Compression weight: 0.155 g.

EXAMPLE 14

Capsule, 50 mg.

Formula: Mg.
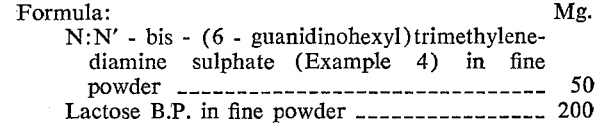

Method of preparation:

(1) Blend the powders.

(2) Fill into No. 2 hard gelatin capsules filling 250 mgm. into each capsule.

EXAMPLE 15

Dusting powder 5% w./w.

Formula: G.
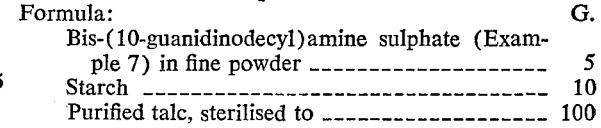

Method of preparation:

(1) Sift the powders through a 100 mesh screen.

(2) Blend.

EXAMPLE 16

Cream 5% w./w.

Formula: G.
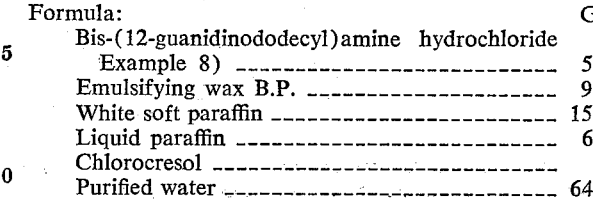

Method of preparation:

(1) Dissolve the bis-(12-guanidinododecyl) amine hydrochloride and chlorocresol in the purified water with the aid of gentle heat, if necessary.

(2) Melt the other ingredients and add the aqueous solution gradually with stirring.
(3) Stir until cold and homogenise.

EXAMPLE 17

Ointment 1% w./w.

Formula:  G.
Bis - (12 - Guanidinodecyl) amine hydrochloride (Example 8) in fine powder _____ 10
Wool fat _____ 90
White soft paraffin _____ 900

Method of preparation:
(1) Melt the wool fat and white soft paraffin. Stir until cold.
(2) Incorporate the bis - (12 - guanidinododecyl) amine hydrochloride mixing intimately.

EXAMPLE 18

Wettable powder, 25%

Formula:  Parts
Bis - (12 - guanidinododecyl) - amine hydrochloride _____ 25
Fatty alcohol sulphonate _____ 0.5
Calcium lignosulphonate _____ 6
China clay to _____ 100

EXAMPLE 19

Soluble 0.05%

Formula:  Parts
Bis - (12 - guanidinodecyl)-amine hydrochloride _____ 5
Water _____ 10,000

In Examples 18 and 19 the active substance can, if desired, be replaced by an equivalent quantity bis-(10-guanidinodecyl) - amine hydrochloride or bis - (8-guanidinooctyl) - amine sulphate.

We claim:
1. A compound selected from the group consisting of:

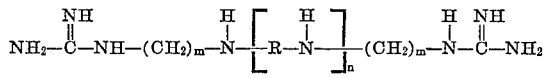

and the acid addition salts thereof, wherein R is alkylene of 3 to 6 carbon atoms, $m$ is 3 to 12 and $n$ is 0 to 2.

2. A compound as claimed in claim 1 which is an acid addition selected from the group consisting of a hydrochloride, hydrobromide, sulphate, perchlorate, nitrate, phosphate, pyrophosphate, acetylsalicylate, formate, acetate, propionate, glycolate, lactate, pyruvate, malonate, succinate, maleate, fumarate, malate, tartrate, citrate, oxalate, benzoate, salicylate, methanesulphonate, ethanesulphonate, and p-toluene sulphonate.

3. The compound

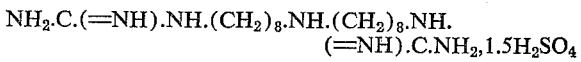

4. N,N' - bis - (3 - guanidinopropyl) - hexamethylene diamine.
5. N,N' - bis (6 - guanidinohexyl) - hexamethylene diamine.
6. N,N' - bis - (6 - guanidinohexyl) - trimethylene diamine.
7. Bis - (8 - guanidinooctyl) - amine.
8. Bis - (10 - guanidinodecyl) - amine.
9. Bis-(12-guanidinododecyl) - amine.
10. Bis-[3-(3-guanidinopropylamino) propyl]-amine.
11. Bis-(6-guanidinohexyl)-amine.
12. N,N'-bis-(6-guanidinohexyl)-isopropylenediamine.

References Cited

UNITED STATES PATENTS

| | | | |
|---|---|---|---|
| 2,460,733 | 2/1949 | Bruson et al. | 260—583 |
| 3,010,782 | 11/1961 | McCaleb et al. | 21—2.7 |
| 3,200,151 | 8/1965 | Spickett et al. | 260—564 |
| 3,283,003 | 11/1966 | Jack et al. | 260—564 |

OTHER REFERENCES

Cheymol et al: Chemical Abstracts, vol 60, pp. 13,138–39 (1964).
Robin et al: Chemical Abstracts, vol. 55, p. 16,419 (1961).
Robin et al: Chemical Abstracts, vol. 58, p. 11,613 (1963).
Short et al: Jour. Med Chem., vol 6, pp. 275–83 (1963).

ROBERT V. HINES, Primary Examiner

U.S. Cl. X.R.

260—551, 552, 583, 558, 561, 465.5; 424—326